(12) United States Patent
Gass et al.

(10) Patent No.: US 9,919,369 B2
(45) Date of Patent: Mar. 20, 2018

(54) INSERTS FOR TABLE SAWS

(71) Applicant: SD3, LLC, Tualatin, OR (US)

(72) Inventors: Stephen F. Gass, West Linn, OR (US); James F.W. Wright, Sherwood, OR (US)

(73) Assignee: SawStop Holding LLC, Tualatin, OR (US)

( * ) Notice: Subject to any disclaimer, the term of this patent is extended or adjusted under 35 U.S.C. 154(b) by 111 days.

(21) Appl. No.: 14/517,522

(22) Filed: Oct. 17, 2014

(65) Prior Publication Data

US 2015/0107430 A1    Apr. 23, 2015

Related U.S. Application Data

(60) Provisional application No. 61/892,231, filed on Oct. 17, 2013.

(51) Int. Cl.
| | |
|---|---|
| *B27B 27/06* | (2006.01) |
| *B27B 5/18* | (2006.01) |
| *B26D 1/18* | (2006.01) |
| *B27B 27/04* | (2006.01) |
| *B27B 3/28* | (2006.01) |
| *B23D 47/02* | (2006.01) |
| *B25H 1/14* | (2006.01) |

(52) U.S. Cl.
CPC ............. *B23D 47/025* (2013.01); *B25H 1/14* (2013.01); *Y10T 83/773* (2015.04)

(58) Field of Classification Search
CPC ........ B23D 47/025; B25H 1/14; Y10T 83/773
USPC ....................... 83/477.1, 477.2, 471.3, 440.2
See application file for complete search history.

(56) References Cited

U.S. PATENT DOCUMENTS

| | | | |
|---|---|---|---|
| 1,183,383 A | | 5/1916 | Jenkins |
| 1,816,069 A | | 7/1931 | Bennett |
| 1,938,548 A | * | 12/1933 | Tauts ....................... B23Q 1/74 |
| | | | 451/278 |
| 2,008,673 A | | 7/1935 | Ocenasek |
| 2,294,272 A | * | 8/1942 | Boice ................... B23D 59/002 |
| | | | 83/471.3 |
| 2,394,034 A | * | 2/1946 | Blum ..................... B23D 51/14 |
| | | | 30/514 |
| 2,403,247 A | | 7/1946 | Sullivan |

(Continued)

FOREIGN PATENT DOCUMENTS

| | | |
|---|---|---|
| CA | 731978 A | 4/1966 |
| IT | 430939 | 2/1948 |

OTHER PUBLICATIONS

SI16WA-WF Circular Saw with Tilting Blade Spare Parts Catalogue, SCMI Corporation, Norcross, GA, Nov. 1986 and 1991.

(Continued)

*Primary Examiner* — Ghassem Alie
*Assistant Examiner* — Bharat C Patel

(57) ABSTRACT

Inserts for use in table saws are disclosed. One embodiment may include a mechanism to lock mechanically and affirmatively the insert in a blade opening in a table saw. The mechanism is designed so that a user can install and remove the insert without tools. The mechanism also can be designed so that the front of the insert pops up above the table when released from its locked position. The mechanism can be further designed so that the insert can be unlocked or released by a user pressing a button or tab.

1 Claim, 13 Drawing Sheets

(56) References Cited

U.S. PATENT DOCUMENTS

| | | | |
|---|---|---|---|
| 2,569,914 A | 10/1951 | Appleton | |
| 2,593,596 A | 4/1952 | Olson | |
| 2,615,479 A | 10/1952 | Bearup | |
| 2,810,412 A | 10/1957 | Roug | |
| 3,269,433 A * | 8/1966 | Packard | B27C 9/02 144/1.1 |
| 3,285,303 A * | 11/1966 | Kwiatkowski | B23D 47/025 83/477.1 |
| 3,289,713 A * | 12/1966 | Herzog | B23D 47/025 292/228 |
| 3,386,482 A * | 6/1968 | Nadeau | B27B 5/182 83/477.1 |
| 3,490,637 A | 1/1970 | Pope | |
| 3,581,784 A * | 6/1971 | Warrick | B23D 45/068 83/477.1 |
| 3,866,502 A | 2/1975 | Brewer, Sr. | |
| 4,031,934 A | 6/1977 | Stadler | |
| 4,058,070 A | 11/1977 | Jones | |
| 4,095,632 A * | 6/1978 | Raulinaitis | B23Q 9/0014 144/136.95 |
| 4,150,633 A | 4/1979 | Adams | |
| 4,159,003 A | 6/1979 | Johnson et al. | |
| 4,194,456 A | 3/1980 | Edwards et al. | |
| 4,335,765 A | 6/1982 | Murphy | |
| 4,350,193 A | 9/1982 | McCambridge et al. | |
| 4,395,962 A | 8/1983 | Odermann | |
| 4,487,330 A | 12/1984 | Grover et al. | |
| 4,543,866 A | 10/1985 | Maier et al. | |
| 4,635,692 A | 1/1987 | Hulse et al. | |
| 4,694,763 A | 9/1987 | Adams | |
| 5,013,195 A | 5/1991 | Strazar | |
| 5,159,864 A * | 11/1992 | Wedemeyer | B23D 47/025 83/13 |
| 5,231,906 A * | 8/1993 | Kogej | B23D 47/025 83/440.2 |
| 5,398,740 A | 3/1995 | Miller | |
| 5,725,038 A | 3/1998 | Tucker et al. | |
| 5,855,234 A | 1/1999 | Everts et al. | |
| 5,857,507 A | 1/1999 | Puzio et al. | |
| 5,901,631 A * | 5/1999 | Minarovic | B23D 47/025 144/3.1 |
| 5,970,835 A * | 10/1999 | Kenyon | B23D 47/025 144/1.1 |
| 6,076,445 A | 6/2000 | Kenyon et al. | |
| 6,216,575 B1 * | 4/2001 | Dils | B23D 45/062 33/640 |
| 6,418,829 B1 * | 7/2002 | Pilchowski | B23D 59/001 83/397 |
| 6,422,116 B1 | 7/2002 | Kenyon et al. | |
| 6,431,042 B1 | 8/2002 | Brault et al. | |
| 6,840,144 B2 | 1/2005 | Huang | |
| 6,900,728 B2 * | 5/2005 | Metzger, Jr. | B23D 59/001 192/129 R |
| 6,942,229 B2 | 9/2005 | Brazell et al. | |
| 7,134,373 B1 * | 11/2006 | Vice | B23D 47/025 83/471.2 |
| 7,210,386 B1 * | 5/2007 | Chang | B23D 47/025 83/102.1 |
| 7,249,549 B2 * | 7/2007 | Stoffel | B23D 47/025 144/286.1 |
| 7,827,890 B2 * | 11/2010 | Gass | B23D 45/067 83/102.1 |
| 7,997,176 B2 * | 8/2011 | Gass | B23D 47/02 83/440.2 |
| 8,122,798 B1 * | 2/2012 | Shafer | B23D 59/001 324/676 |
| 2001/0035081 A1 | 11/2001 | Sutton | |
| 2004/0159200 A1 | 8/2004 | Stoffel | |
| 2004/0232298 A1 * | 11/2004 | Bremmon | F16M 11/10 248/281.11 |
| 2004/0255745 A1 | 12/2004 | Peot et al. | |
| 2005/0188806 A1 | 9/2005 | Garcia et al. | |
| 2006/0219076 A1 | 10/2006 | Gass et al. | |
| 2011/0203438 A1 * | 8/2011 | Nenadic | B23D 47/025 83/477.2 |
| 2012/0007301 A1 * | 1/2012 | Liu | B23D 47/025 269/309 |

OTHER PUBLICATIONS

Inca 2100SE Professional Tablesaw Owners Manual, Injecta Machinery, 1992.
Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Grizzly Industrial, Inc. Heavy-Duty 12" Table Saw Model G5959 and G9957 Parts List, 1998 and Oct. 2001.
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
Two photographs of a saw displayed at a trade show on Aug. 23, 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
Ryobi 10" Table Saw BT3000 Operator's Manual, Ryobi Technologies, Inc., Mar. 2001.
SC 3W Circular Saw Manual, SCM Group S.p.A Divisione Minimax—Samco, Feb. 2001.
Bosch 10" Table Saw Model 0601476139 Parts List and Technical Bulletin, S-B Power Tool Company, Apr. 2001.
SI450E Circular with Tilting Blade Spare Parts Catalogue, SCM, Apr. 26, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Ryobi 10" Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
The Merlin Splitter by Excalibur a Sommerville Design Product Overview & Generic Installation Notes, Sommerville Design & Manufacturing Inc., at least as early as 2002.
Rojek Circular Saw PK 300 Spare part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
SI300S-SI30054 Circular with Tilting Blade Spare Parts Catalogue, SCM, Oct. 30, 2003.
Delta Biesemeyer 10" Table Saw Blade Guard Systems Instruction Manual, Delta Machinery, May 9, 2005.
Powermatic WMH Tool Group Operating Instructions and Parts Manual 10-inch Cabinet Saw Model 2000, Nov. 2005.
Makita Model 2704 Exploded Drawings and Parts List, Nov. 2005.
Porter-Cable 10" Portable Table Saw 3812, Porter-Cable Corporation, 2005.
Porter Cable 10" Portable Table Saw Model 3812 Parts List with Guard Exploded View, 2005.
Grizzly Industrial, Inc. Model G0605X/G0606X Extreme Series 12" Table Saw Owner's Manual, Grizzly Industrial, Inc., Oct. 2006.

(56) References Cited

OTHER PUBLICATIONS

Makita Table Saw 2704 Instruction Manual, Makita Corporation of America, date unknown.
SCM SI 450 Circular saw with tilting blade product brochure, Villa Verucchio, Italy, undated.
Powermatic, Accu-Fence for the Models 66, 72A & 74A Table Saws Instruction Manual & Parts List, undated.
SCM Group publication, Rimini, Italy, undated.
Laguna Tools table saw owner's manual, date unknown.

* cited by examiner

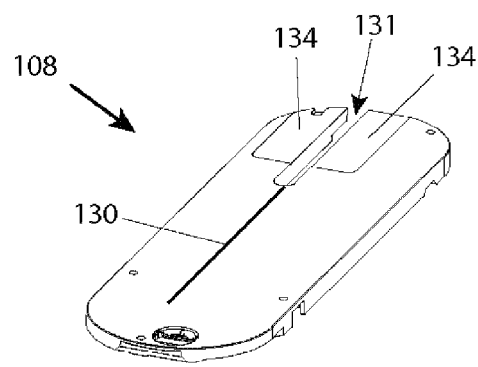
Fig. 2
Fig. 4
Fig. 5
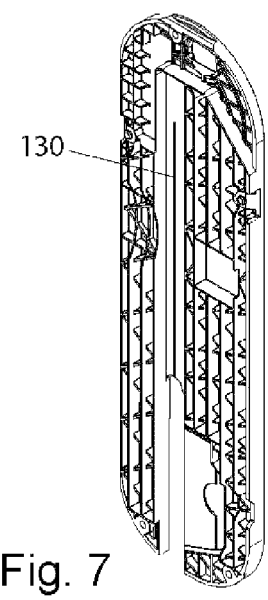
Fig. 7
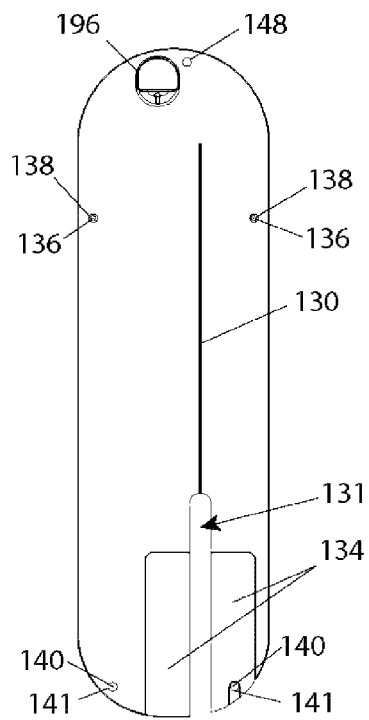
Fig. 3
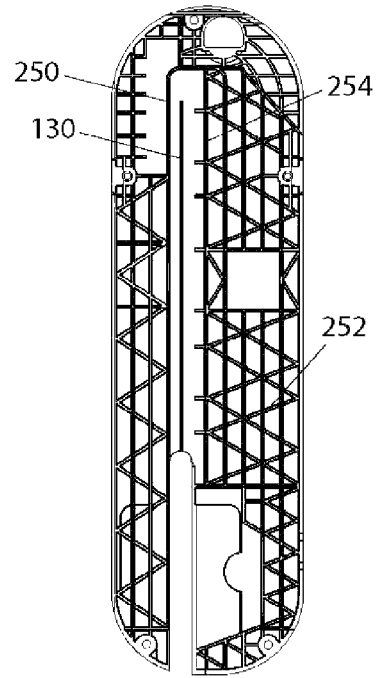
Fig. 6
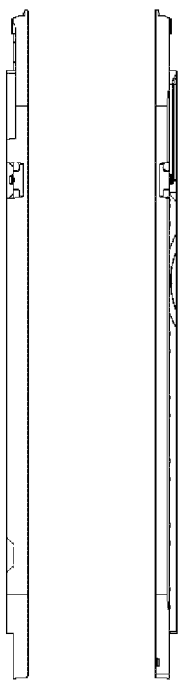
Fig. 8
Fig. 9

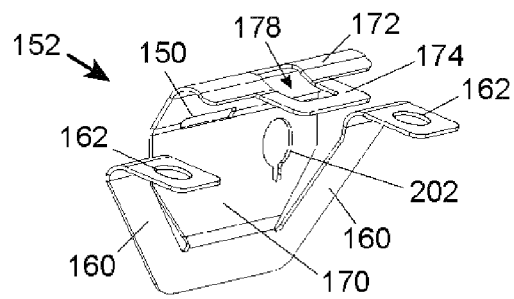
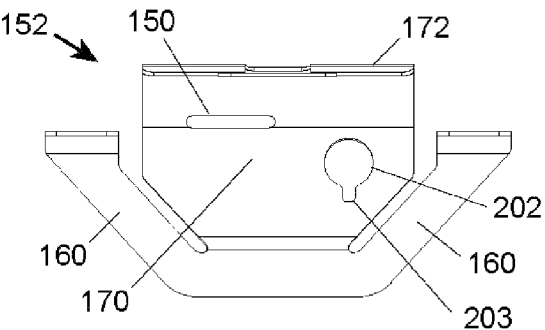
Fig. 15  Fig. 16
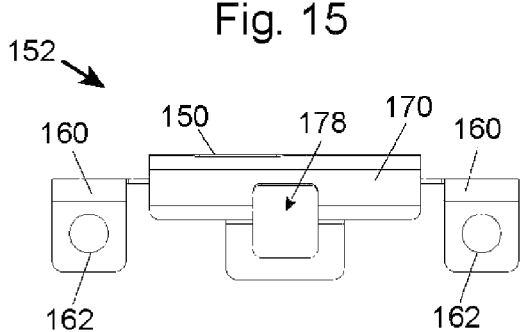
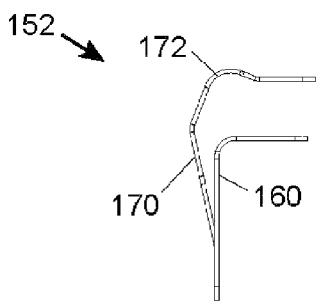
Fig. 17  Fig. 18
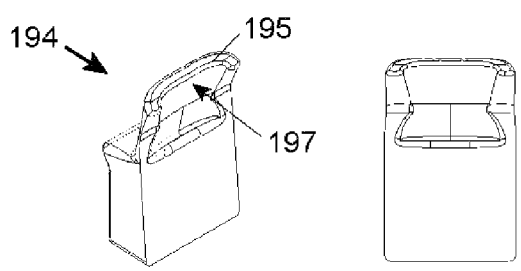
Fig. 19  Fig. 20  Fig. 21  Fig. 22
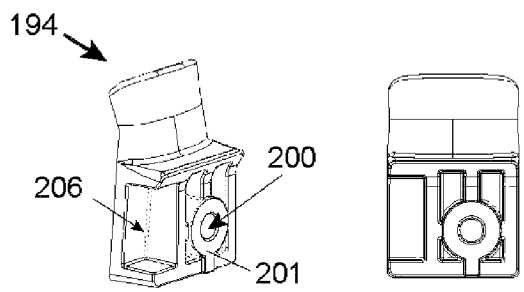
Fig. 23  Fig. 24  Fig. 25  Fig. 26

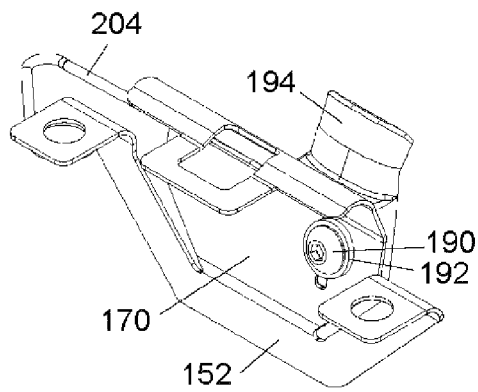 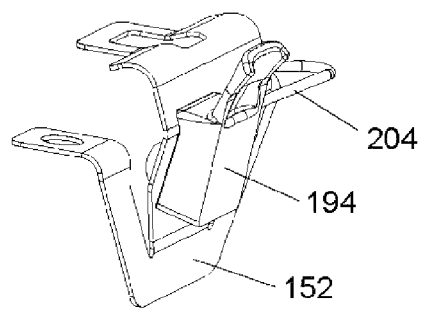
Fig. 27　　　　　　Fig. 28
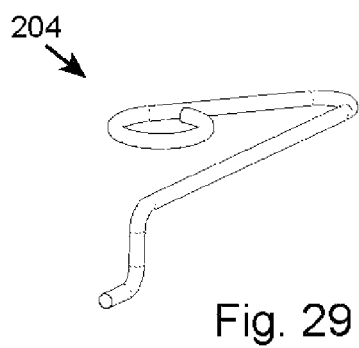 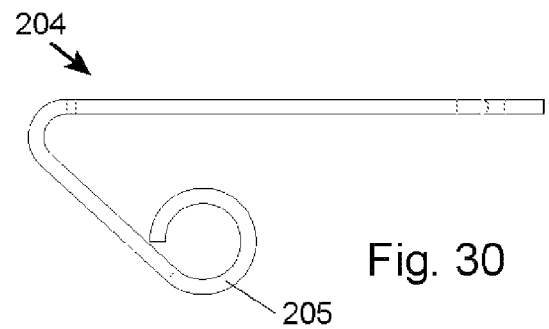
Fig. 29　　　　　　Fig. 30
 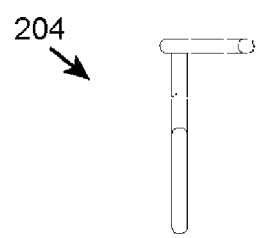
Fig. 31　　　　　　Fig. 32

INSERTS FOR TABLE SAWS

CROSS-REFERENCE TO RELATED APPLICATION

This application claims the benefit of and priority from U.S. Provisional Patent Application Ser. No. 61/892,231, filed Oct. 17, 2013, which is incorporated herein by reference.

TECHNICAL FIELD

The present specification relates to inserts (also known as throat plates) for table saws. More specifically, this specification relates to inserts that are easy and intuitive to use, are compatible with active injury mitigation systems, are less expensive to manufacture than other inserts compatible with active injury mitigation systems, and are mechanically held or locked in place in a table saw.

BACKGROUND

A table saw is a power tool used to cut a work piece to a desired size or shape. A table saw includes a work surface or table and a circular blade extends up through the table. A person uses a table saw by placing a work piece on the table and feeding it into contact with the spinning blade to cut the work piece to a desired size. The table saw is one of the most basic machines used in woodworking.

The blade in a table saw extends from below the work surface to an elevation above the work surface. Typically there is an opening in the table called a "throat" or "blade opening" through which the blade extends, and the blade opening is large enough for a user to perform some types of service or maintenance to the saw through the opening, such as changing the blade. An opening in the table around the blade, however, means the table cannot support a work piece next to the blade. Accordingly, an "insert" (also called a "throat plate") is placed in the opening around the blade to support a work piece adjacent the blade. The insert includes a slot or channel through which the blade extends. The insert is removable so a user can access internal components of the saw through the blade opening (for example, a user can remove the insert to change the blade or to change a component in an active injury mitigation system such as a brake cartridge).

An insert may be very close to the blade, especially if the insert is a zero-clearance insert. A zero-clearance insert starts as a solid insert without any slot for the blade. The insert is placed in the blade opening in the saw table and the spinning blade is then raised through the insert to cut a slot. Using the blade to cut a slot in the insert insures that the insert remains as close as possible to the blade, or in other words, the insert has "zero clearance" to the blade.

Inserts typically lock in place in the blade opening so that the blade does not kick the insert back toward the user if the blade contacts the insert. Locking the insert in place also prevents the insert from popping up and presenting an edge that might catch a work piece as the work piece moves toward the blade. Also, a zero-clearance insert locks in place so that the insert is held down when the spinning blade rises up through the insert to cut the slot in the insert.

Some saws include active injury mitigation systems to detect when a dangerous condition occurs while using a saw and to react to minimize any injury. For example, some active injury systems detect when a user contacts the spinning blade and then stops and/or retracts the blade so quickly that a user typically receives only a small nick rather than a devastating injury. In these saws, an electrical signal is imparted to the blade and the active injury mitigation system monitors the signal for changes indicative of contact. In such a saw, an insert or throat plate typically is made of non-conductive material or coated with non-conductive material so that the electrical signal on the blade remains essentially unaffected if the blade contacts the insert. If the insert were made of conductive material and the blade contacted the conductive material, the electrical signal could be grounded and the active injury mitigation system could trigger or no longer be able to detect changes in the signal indicative of contact. Additionally, inserts made of conductive material can create a parasitic capacitance to the blade which can affect active injury mitigation systems.

Inserts need to be rigid and flat to provide support for work pieces and it has proven difficult to design inserts that are sufficiently rigid, flat and non-conductive. Typically, inserts used with active injury mitigation systems have been made of phenolic or wood to provide the required rigidity, flatness and non-conductivity.

BRIEF DESCRIPTION OF THE DRAWINGS

FIG. 2 shows a perspective view of an insert.
FIG. 3 shows a top view of an insert.
FIG. 4 shows a front end view of an insert.
FIG. 5 shows a rear end view of an insert.
FIG. 6 shows a bottom view of an insert.
FIG. 7 shows a perspective view of the bottom of an insert.
FIG. 8 shows a right side edge of an insert.
FIG. 9 shows a left side edge of an insert.
FIG. 15 shows a perspective view of a bracket used to hold down an insert.
FIG. 16 shows a front view of the bracket of FIG. 15.
FIG. 17 shows a top view of the bracket of FIG. 15.
FIG. 18 shows a side view of the bracket of FIG. 15.
FIG. 19 shows a perspective view of a button used in a mechanism to hold down an insert.
FIG. 20 shows a back view of the bracket of FIG. 19.
FIG. 21 shows a right side view of the bracket of FIG. 19.
FIG. 22 shows a top view of the bracket of FIG. 19.
FIG. 23 shows another perspective view of the bracket of FIG. 19.
FIG. 24 shows a front view of the bracket of FIG. 19.
FIG. 25 shows a left side view of the bracket of FIG. 19.
FIG. 26 shows a bottom view of the bracket of FIG. 19.
FIG. 27 shows a bracket, button and spring assembled for use in a mechanism to hold down an insert.
FIG. 28 shows another view of the assembly of FIG. 27.
FIG. 29 shows a spring used in the assembly of FIG. 27.
FIG. 30 shows a front view of the spring of FIG. 29.
FIG. 31 shows a top view of the spring of FIG. 29.
FIG. 32 shows a side view of the spring of FIG. 29.

DETAILED DESCRIPTION

Figure 1:
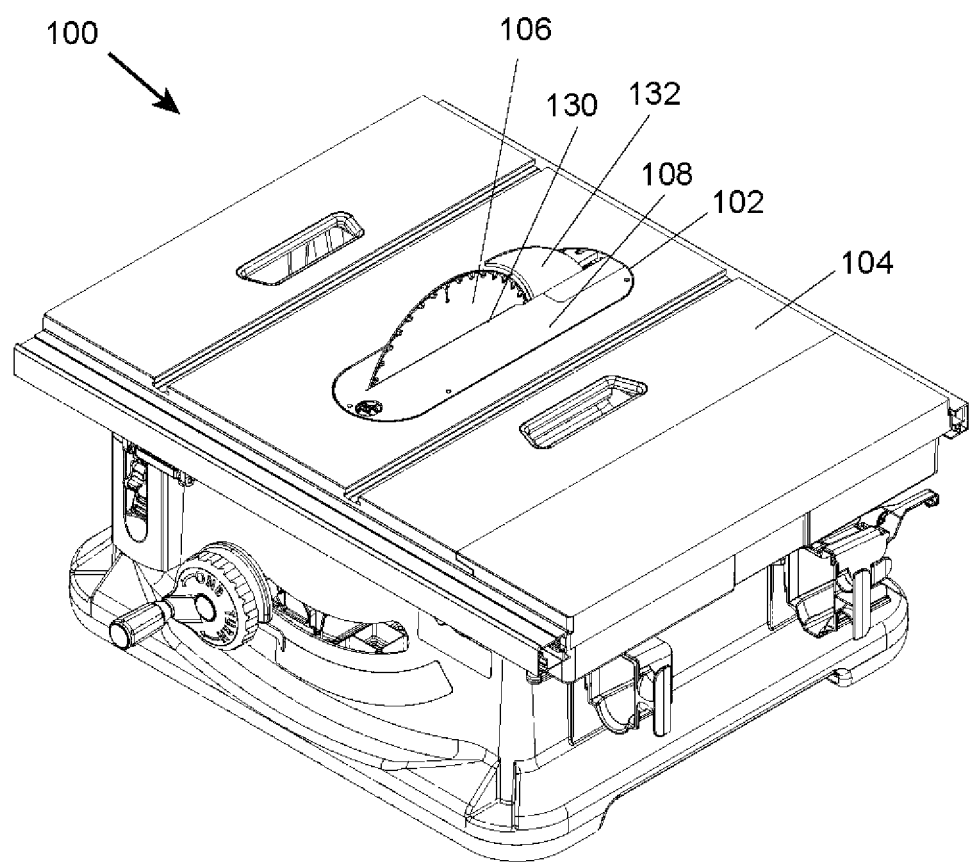
FIG. 1 shows a table saw with a table saw with an insert or throat plate.

FIG. 1 shows a table saw 100 with a blade opening 102 in a table 104. A blade 106 extends up through the table and opening, and an insert 108 surrounds the blade and covers the opening. Various views of insert 108 are shown in FIGS. 2 through 9.

Insert 108 is shaped to fit within blade opening 102 in the table. In the depicted embodiment, insert 108 is shaped something like a long oval. Of course, other shapes are possible.

Figure 10:
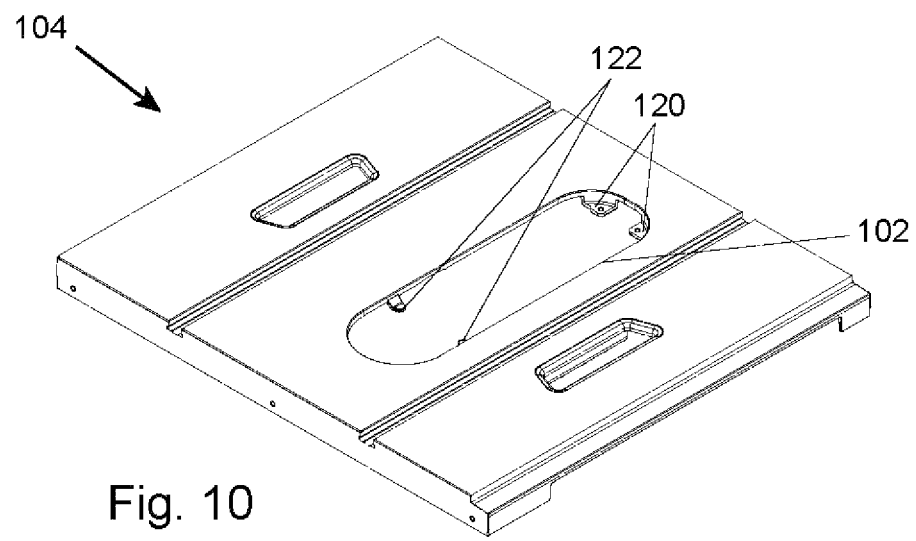
FIG. 10 shows a perspective view of a table.
Figure 11:
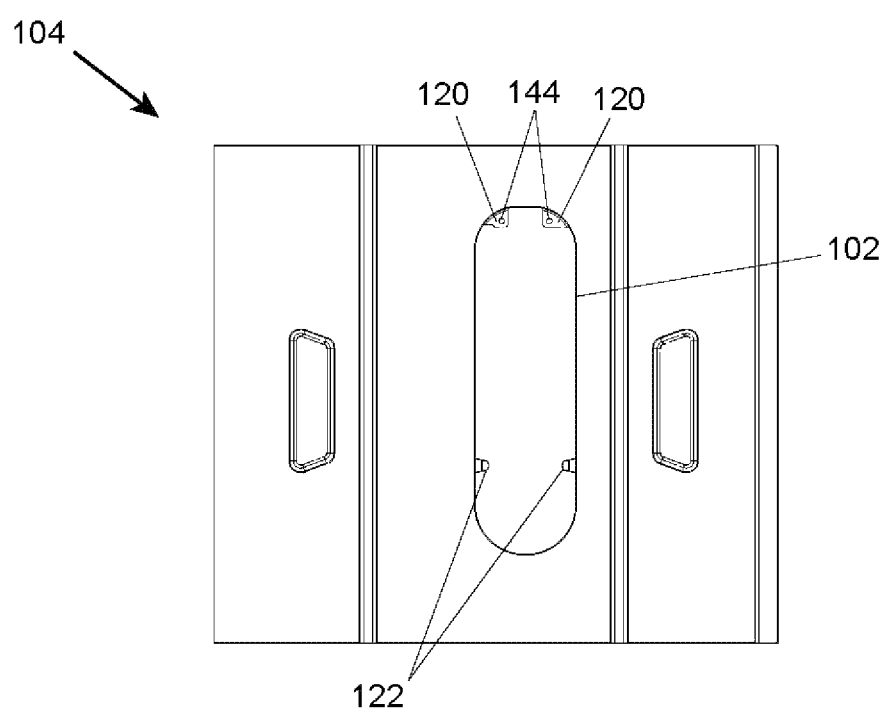
FIG. 11 shows a top view of a table.

Blade opening 102 has four support tabs, or ledges, that extend a short ways inward into opening 102 from the underside of the table, two tabs 120 along the rear of opening 102, and two tabs 122, one along each side near the front of opening 102, as shown in FIGS. 10 and 11. Tabs 120 and 122 support insert 108 when the insert is placed within the blade opening. The insert can be adjusted so that the top surface of the insert is substantially coplanar with the top of table 104 by turning screws 136, which thread through holes 138 in the insert and contact tabs 122.

As shown in FIGS. 2 and 3, insert 108 has a slot 130 that runs from a wider opening 131 at the rear of the insert to near the front, and the blade extends through the slot. The insert depicted in FIGS. 1 through 9 is a zero-clearance insert, so slot 130 is cut by the blade, as explained, and runs next to the blade along most of the slot's length. Slot 130 connects with opening 131 at the rear of the slot (the rear of the slot is the portion of the slot furthest away from the front of the table saw when the insert is in the blade opening). Opening 131 allows room for a riving knife 132 or splitter to extend up through the insert.

At the rear of opening 131, on both sides, there are wear plates 134 to protect the surface of the insert from the sharp tips of anti-kickback pawls that may be installed on a splitter or blade guard.

The rear of the insert can be held down and/or locked into place in many ways. In the depicted embodiment two screws 140 are threaded into holes 141 from the bottom of the insert so that the heads of the screws extend down below the insert. Holes 141 extend through the insert and the threaded ends of screws 140 have sockets so that a user can turn the screws from above the table by placing a wrench or driver into the sockets through holes 141 and turning. The heads of screws 140 are used to hold the rear of the insert locked down when the insert is installed. As seen in FIG. 11, two screws 144 are threaded into holes in tabs 120, and the heads of screws 140 slide under the heads of screws 144 so that the heads overlap to lock the rear of the insert in place, as described in U.S. Pat. No. 7,997,176, issued Aug. 16, 2011, which is hereby incorporated by reference. Alternatively, the insert may include a tab that fits into a socket in the table, or that fits under an edge of the table, to hold the rear of the insert down.

The front of the insert can also be held down and/or locked in place in many ways. Often a screw extends down through the insert and threads into a hole in the table to lock the insert in place. However, if a screw is used to lock the insert in place, a screwdriver is required to remove the insert, which makes the insert more difficult to remove and install. Alternatively, a knob, lever, latch or bale may be used to hold down the front of an insert, as described in U.S. Patent Application Publication 2011/0203438, published Aug. 25, 2011, which is hereby incorporated by reference. The devices described in that publication do not require a screwdriver or other tool to remove and install the insert.

Figure 12:
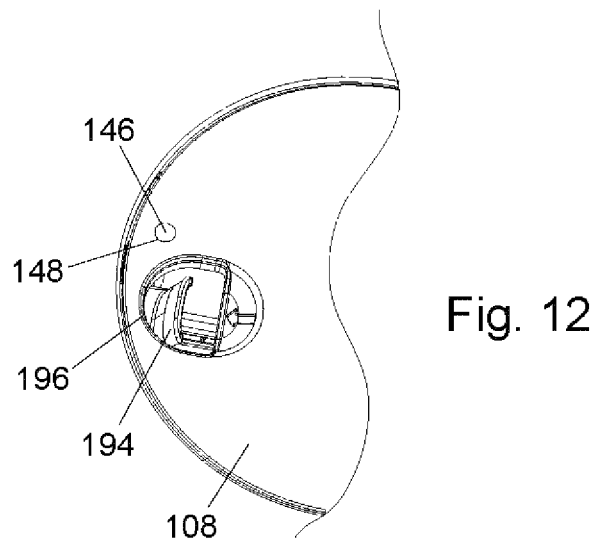
FIG. 12 shows the front end of an insert in a blade opening with a hold-down mechanism looking down from above the table.
Figure 13:
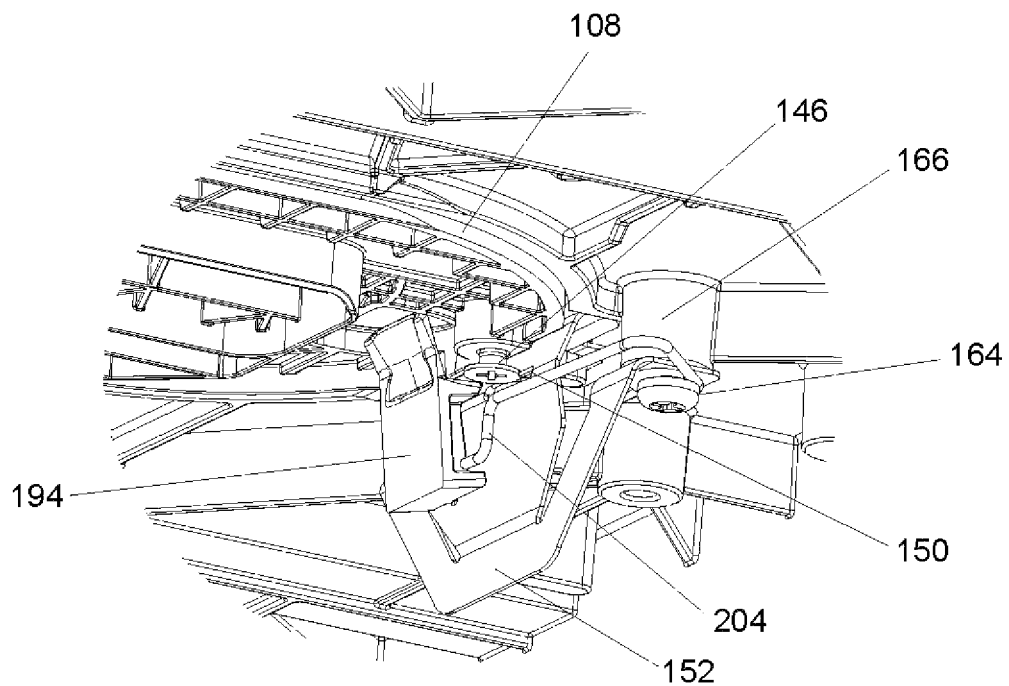
FIG. 13 shows the front end of an insert in a blade opening with a hold-down mechanism looking up from under the table.

FIGS. 12 and 13 show a mechanism to hold down the front of an insert that is simple to operate and that does not require a tool to install, lock, unlock or remove. FIG. 12 shows the front end of an insert placed in a blade opening, looking down from above the table. The insert includes a finger hole 196 and a button or tab 194 adjacent the finger hole so that a user can reach into the hole and press the button. In the depicted embodiment, the button is configured to be pressed toward the front of the saw to release the insert from the blade opening because pressing the button in that direction is a convenient, intuitive and simple movement when a finger is inserted into hole 196.

FIG. 13 shows the hold-down mechanism, looking up from under the insert and table. A screw 146 threads into the bottom of insert 108 adjacent the front of the insert. The screw threads into a hole 148 that extends through the insert, and the threaded end of screw 146 is accessible from above the insert, as shown in FIG. 12. The threaded end of screw 146 may include a socket so that a user can insert a wrench or other driver into the socket to turn the screw from above the insert to adjust the hold-down mechanism. The opposite end of screw 146 has a button or flat head that provides a shoulder, and the screw head extends down from the underside of the insert to mesh with a bracket 152. The shoulder on screw 146 may be thought of as an example of a first edge.

Figure 14:
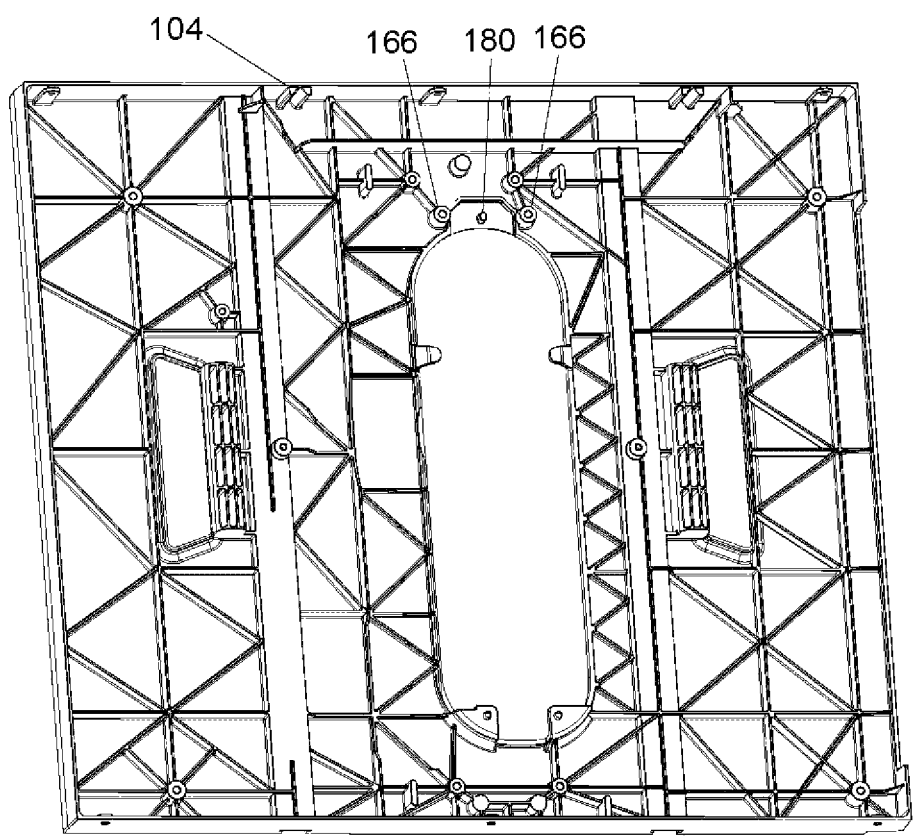
FIG. 14 shows the bottom of a table.

Bracket 152 is attached to the bottom of table 104 by bolts, such as bolt 164, that thread into sockets 166 (bolt 164 is shown in FIG. 13 and sockets 166 are shown in FIG. 14). Bracket 152 is shown isolated from other structure in FIGS. 15 through 18. The bracket includes a slot 150 configured to receive the shoulder of the head of screw 146. The bracket is positioned so that when the insert is placed in the blade opening, the head of screw 146 fits into slot 150 in bracket 152. When the head of screw 146 fits into slot 150, the insert is locked down because the edge of the slot overlaps the head of screw 146. Slot 150 in bracket 152 may be thought of as an example of a second edge. This provides a mechanical hold-down rather than a mere friction fit. Providing a mechanical hold-down is especially important for zero-clearance inserts because the insert must be held down when the blade cuts the slot in the insert. To cut a slot in a zero-clearance insert, the blade is fully lowered, a new insert without a blade slot is installed, the saw is turned on so that the blade spins, and the spinning blade is then raised up and through the insert to cut the slot for the blade. If the insert were not held down, the blade could push the insert up and possibly kick it forward rather than cutting through the insert.

Bracket 152 includes two side sections 160 that extend up toward the underside of the table and that terminate in holes 162. The bracket is mounted to the underside of the table by bolts passing through holes 162.

Bracket 152 also includes a middle section 170 that includes slot 150. Middle section 170 bends out at about 15 degrees away from side sections 160, and then, near the top, it bends back at about 30 degrees towards the side sections, where it bends again, making a rounded hump 172 that runs along the top of the bracket, and then flattens in the middle to form a square tab 174 that extends out from the middle of the top of the bracket and runs substantially parallel to the underside of the table. The small, narrow rectangular slot 150, through which the end of the head of screw 146 fits, lies horizontally along a bend in the middle section, as shown in FIGS. 15 and 16.

When insert 108 is placed in the blade opening in the table, the head of screw 146 will contact the upper part of middle section 170 of bracket 152 and cause the middle section to flex toward the front of the saw. The upper part of middle section 170 provides a sloped surface to contact screw 146 so that the screw flexes the middle section forward (i.e., toward the front of the saw) as the screw slides down the middle section. The screw slides down middle section 170 until the head of screw 146 meets slot 150, at which time the middle section springs back so that the head of screw 146 is captured in slot 150, locking the insert down. Thus, middle section 170 may be thought of as a spring or flex plate that catches screw 146. Screw 146 can be turned to adjust the position of the screw so that it meshes with slot 150 in bracket 152. Turning screw 146 also adjusts the height of the front of the insert relative to the surface of the table, or in other words, turning screw 146 adjusts the position of the front of the insert relative to the table so that the top front of the insert is substantially coplanar with the top of the table.

The top of middle section 170 includes a rectangular cutout 178 in tab 174 and hump 172, and the cutout fits around a flange or protrusion 180 that extends downward from the underside of the table (protrusion 180 is shown in FIG. 14). By fitting around protrusion 180, cutout 178 limits the movement of middle section 170 toward the front and rear of the saw, while still allowing the middle section to flex and move to accommodate installation of the insert. Hump 172 functions like a stop to contact the underside of the table and prevent the insert from being removed from the blade opening if a user pulls the insert up without releasing screw 146 from bracket 152.

Button or tab 194 is attached to middle section 170 of bracket 152 so that a user can press the button to flex the middle section and release screw 146 from slot 150. Button 194 is shown isolated in FIGS. 19 through 26.

Button 194 has a generally square-shaped body with a tab 195 extending up from the body. The tab has a generally concave surface 197 shaped to receive a finger. The body of button 194 opposite and below concave surface 197 includes a hole 200. Button 194 attaches to middle section 170 of bracket 152 by a bolt 190 passing through a washer 192, then passing through a hole 202 in the middle section of the bracket, and then threading into hole 200 in button 194, as shown in FIGS. 27 and 28. Hole 200 in button 194 is surrounded by a slight projection 201. The projection is shaped and sized to fit into hole 202 in middle section 170 of bracket 152. Projection 201 and hole 202 are generally circular in shape, but include a small key and key hole, respectively, extending out from the perimeter of the circle so that button 194 does not rotate in hole 202 (the key hole in hole 202 is identified by number 203 in FIG. 16). FIG. 28 shows another view of button 194 attached to bracket 152.

The mechanism to secure the front of the insert includes a spring that causes the front of the insert to pop up above the table when button 194 is pressed to release the insert. In the depicted embodiment, a spring 204, formed from a metal wire, is secured to the underside of the table by bolt 164, as shown in FIG. 13. Spring 204 is shown isolated in FIGS. 29 through 32, and the spring includes a loop 205 at one end through which bolt 164 passes to secure the spring in the saw. Spring 204 runs along the outer surface of middle section 170 of bracket 152, as shown in FIGS. 13, 27 and 28. The end of spring 204 opposite loop 205 extends into a recess 206 in the side of button 194, as shown in FIG. 13 (recess 206 is labeled in FIG. 23), and the recess helps keep the spring in position and protects the end of the spring from possibly snagging and bending. Spring 204 is shaped and positioned so that it presses up against the head of screw 146 when insert 108 is placed in blade opening 102. As insert 108 is placed in blade opening 102, screw 146 contacts and flexes spring 204 as the screw moves down and slips or snaps into slot 150 in bracket 152. The screw is then held in position by slot 150 and spring 204 is held flexed by screw 146 until a user presses button 194. When a user presses button 194, middle section 170 of bracket 152 is flexed away from screw 146 until the screw is released from slot 150, at which time spring 204 pushes screw 146 and the front of insert 108 up. The throw of spring 204, and the position of screw 146, are configured so that the spring pushes the front of the insert up above the top of table 104. For example, the spring may push the front of the insert up approximately 12 millimeters, more or less, above the top of the table. This provides the user of the table saw with a visual and tactile indication when the insert is not fully or properly installed and secured in the blade opening.

Spring 204 also works with middle section 170 of bracket 152 to provide at least some resistance and/or tension against the insert, which helps prevent the insert from vibrating and rattling in the blade opening when the table saw is running. That resistance and/or tension also provides a "feel" to a user when the user installs the insert in the blade opening that indicates the insert is being positioned and installed correctly.

To install an insert as described herein in a table saw, a user would first angle the insert into the blade opening so that the rear of the insert locks in place, such as by screws in the rear of the insert overlapping screws near the rear of the blade opening or by a tab extending from the end of the insert fitting under a lip in the table, as described. The user would then simply press down on the front of the insert until the insert "snapped" in place by screw 146 fitting into slot 150 in bracket 152. Both the front and rear of the insert are then latched down, i.e., held down mechanically and affirmatively due to overlapping edges of components, which is more than a simple friction fit as in other table saws, and a tool is not required to accomplish the mechanical hold-down as in saws where the insert is screwed down. No action other than pressing down the front of the insert is necessary to secure the insert in place; a user need not manipulate a knob, handle, lever or bale to lock the insert in place.

To release and remove the insert, a user simply extends a finger into hole 196 in the insert and presses button 194. Button 194 extends at least partially into hole 196, as described, so the button is easily accessible by a user. Hole 196 is sized and shaped to accommodate a finger, but is small enough or obstructed with a flange or other surface so that a user cannot extend his finger into the hole and contact the saw blade. When a user presses button 194, the front of the insert is released and pops up. A user then lifts the insert slightly up and toward the front of the saw to remove the rear of the insert from the blade opening.

Inserts as described herein, when used in a saw having active injury mitigation technology, can be made of phenolic or wood. Phenolic and wood are both non-conductive, which is necessary for active injury mitigation systems, and are rigid, which is necessary to maintain a flat, supportive surface for a work piece, especially given that a blade slot cut in the insert decreases the overall structural rigidity of the insert. Phenolic and wood, however, are relatively expensive, and a more economical material would result in lower costs. Alternatively, an insert can be made out of metal overmolded with plastic, but those inserts involve extra manufacturing steps.

Experiments have shown that an insert as described herein can be made from approximately 50% glass filled nylon 6. Inserts made from that material are non-conductive, sufficiently rigid, and can be manufactured easily and relatively inexpensively by injection molding. Additionally, approximately 50% glass filled nylon 6 resists scratching and has little discoloration (i.e., it holds color well).

FIGS. 2 through 9 show an insert made from approximately 50% glass filled nylon 6. The bottom surface of the insert includes ribs to provide structural rigidity, such as ribs 250, 252 and 254 identified in FIG. 6. The ribs extend in different directions to provide rigidity both across the width of the insert and along the length of the insert. Some sections of the insert may not have ribs in order to provide clearance for components in the table saw, such as an arbor block or riving knife mount, which can extend close to the bottom of the insert when the blade is raised to its full elevation. Additionally, an elongate center section of the insert does not have ribs in order to provide an area for blade slot 130. Rib 250 borders a side of the area around blade slot 130, and rib 250 is as tall as possible to provide as much rigidity as possible along blade slot 130. Rib 254 borders the opposite side of the blade slot, but rib 254 cannot be as tall as rib 250 because clearance is necessary for the blade to tilt so that a user can make bevel or angled cuts. Other ribs can have varying heights, as seen in FIG. 7, to provide clearance or extra rigidity.

Figure 33:
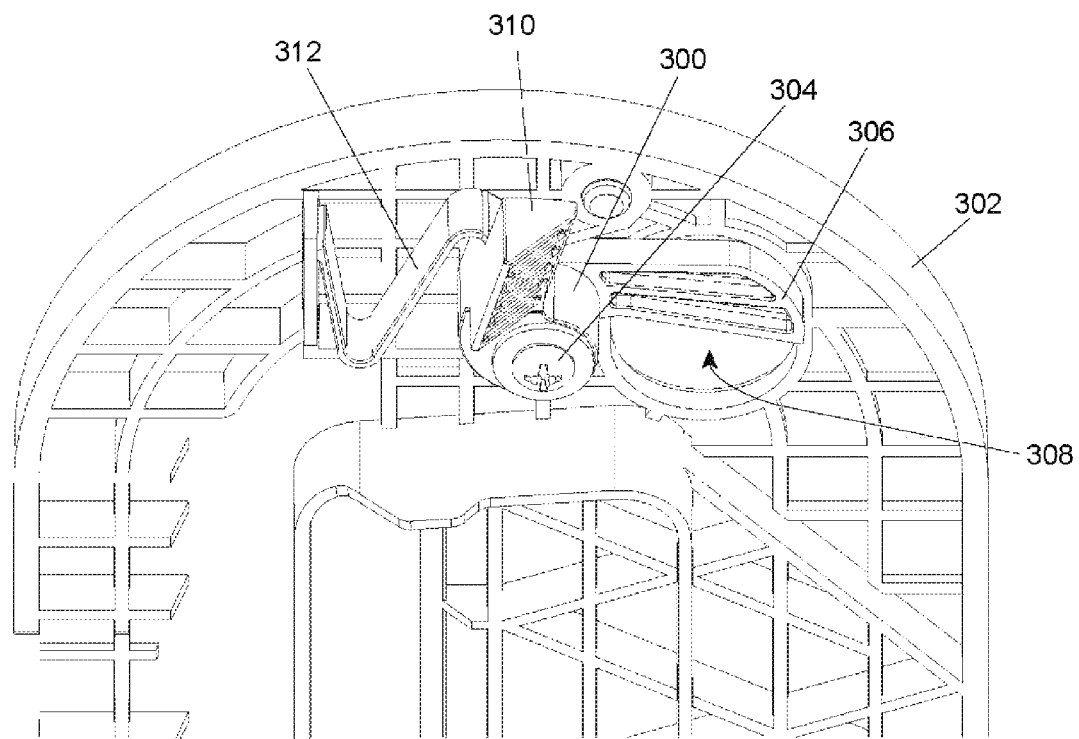
FIG. 33 shows another embodiment of a system to hold down the front of a table saw insert.

Another embodiment of a system to hold down the front of a table saw insert is shown in FIG. 33. A latch 300 is mounted to the bottom of an insert 302 by a screw 304 so that the latch can pivot around the screw. (FIG. 33 shows the front end of the insert, looking up at the bottom of the insert.) The latch includes an arm 306 that extends under a finger hole 308 in the insert so that a user can insert a finger through the hole and move the arm to pivot the latch around screw 304. The latch also includes a flange 310 with a flat upper surface 316 (labeled in FIG. 36) and a sloped or angled lower surface 311 (labeled in FIG. 35). The flat upper surface is configured to overlap a shelf on the table to lock the insert in the blade opening. The flat upper surface may be thought of as an example of a first edge. The angled lower surface is configured to engage the shelf on the table and cause the latch to pivot as the insert is pressed down into the blade opening. The latch pivots until flange 310 clears the shelf, at which time a spring 312 pushes the latch back so that the upper surface of flange 310 overlaps the shelf to hold the insert in place.

Figure 34:
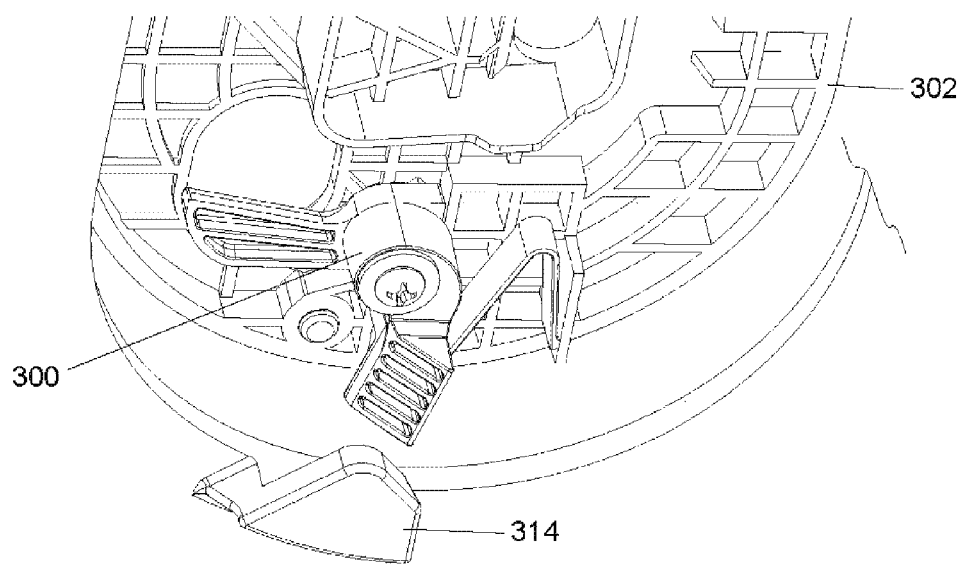
FIG. 34 shows the insert of FIG. 33 as it is being installed in a blade opening.
Figure 35:
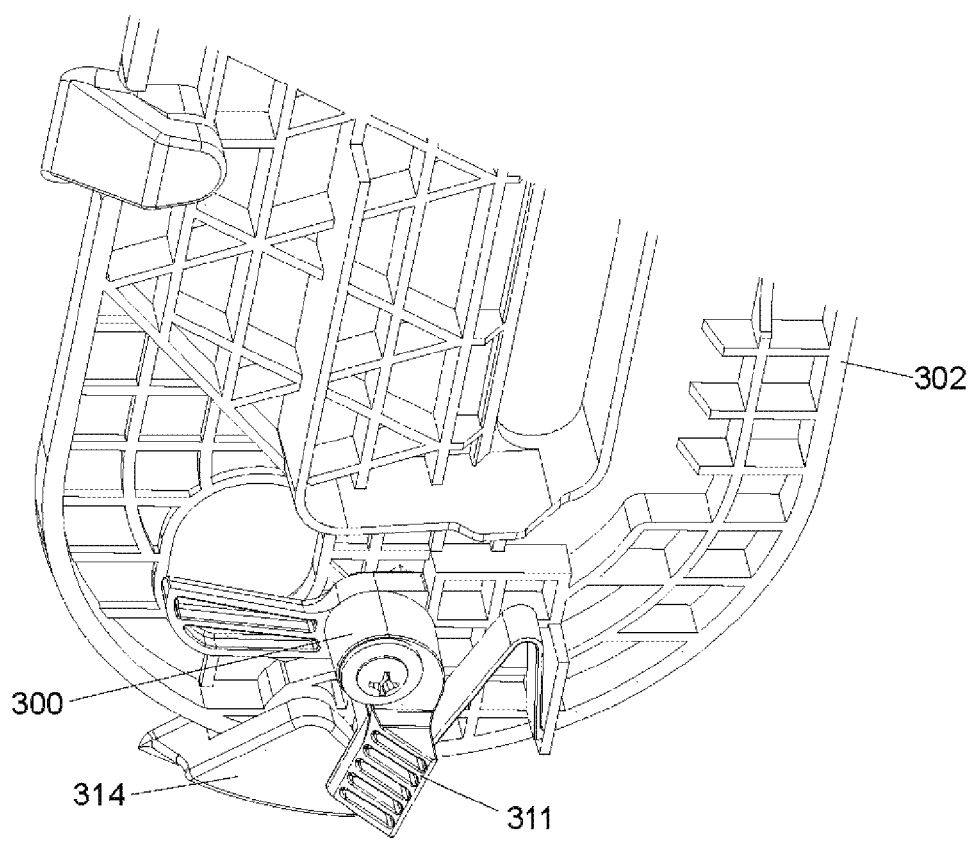
FIG. 35 shows the insert of FIG. 33 installed in a blade opening.

FIG. 34 shows insert 302 positioned over but not yet seated in the blade opening in the table, looking up from underneath the table toward the bottom of the insert. Latch 300 is positioned over shelf 314 in the table, but is not engaged with the shelf. FIG. 35 shows the same insert seated in the blade opening with latch 300 engaging shelf 314 so that the insert is held in place in the blade opening. As can be seen, the upper surface of flange 310 of latch 300 overlaps shelf 314 to hold the insert in place. The shelf 314 may be thought of as example of a second edge.

Figure 36:
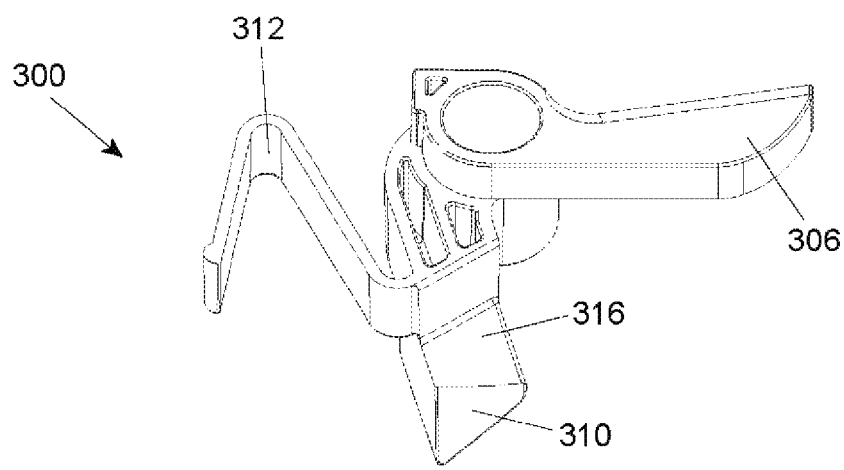
FIG. 36 shows a latch used in the embodiment of FIG. 33.

FIG. 36 shows a top perspective view of latch 300 isolated from other structure.

Figure 37:
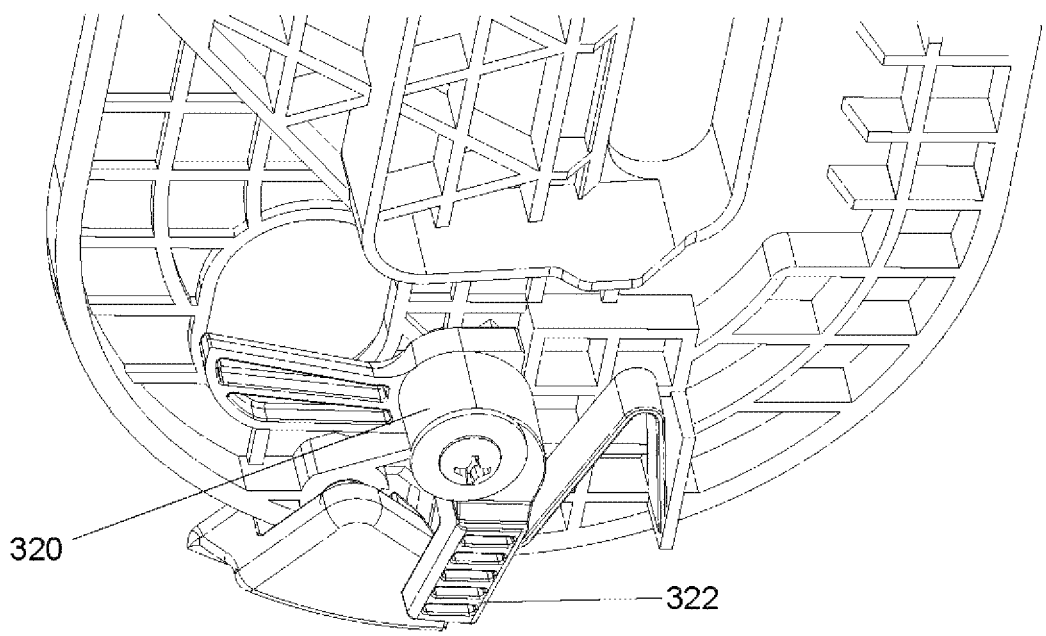
FIG. 37 shows another embodiment of a system to hold down the front of a table saw insert.
Figure 38:
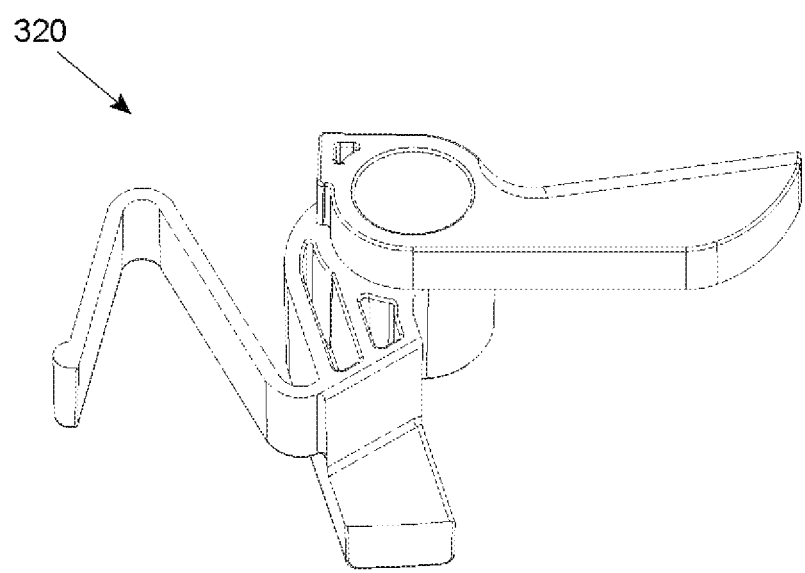
FIG. 38 shows a latch used in the embodiment of FIG. 37.

FIG. 37 shows another embodiment of a system to hold down the front of a table saw insert, with a latch 320 similar to latch 300 discussed above, but without a sloped or angled lower surface. Instead, latch 320 includes a flat lower surface 322. In this embodiment, a user must pivot the latch both to install and remove the insert from the blade opening. FIG. 38 shows latch 320 isolated from other structure.

Figure 39:
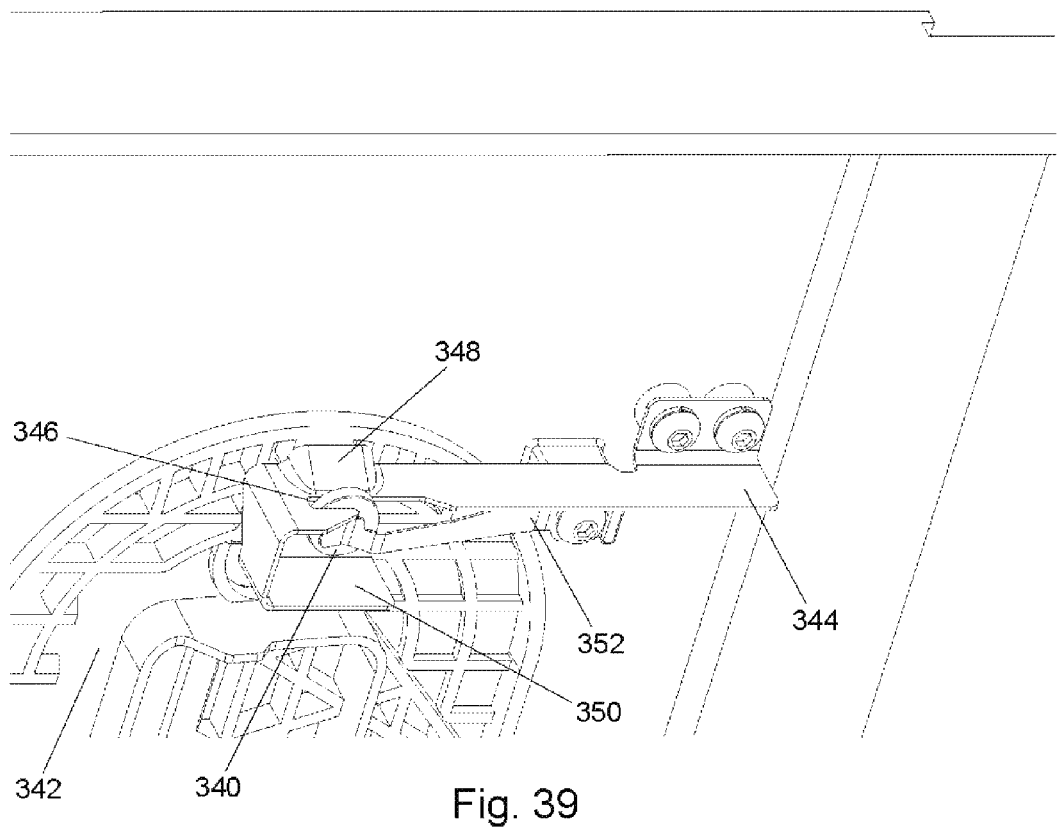
FIG. 39 shows still another embodiment of a system to hold down the front of a table saw insert.
Figure 40:
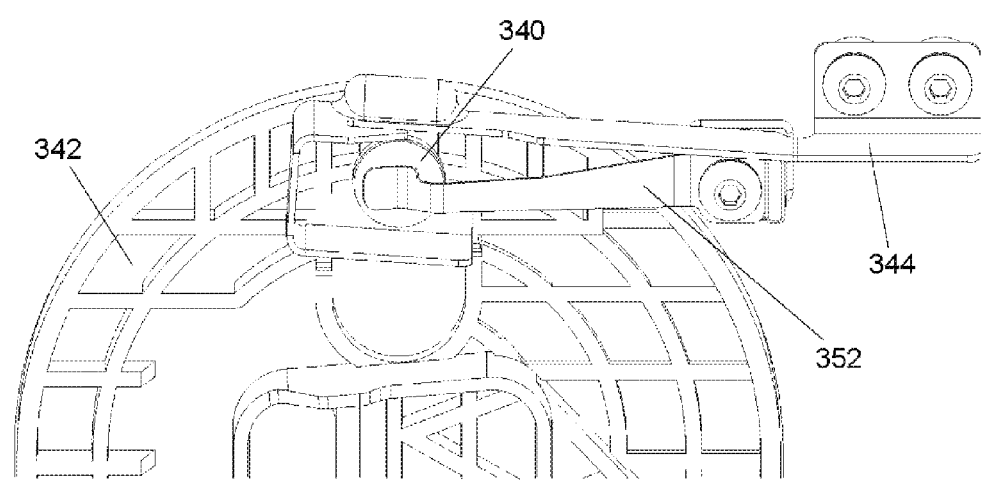
FIG. 40 shows another view of the embodiment of FIG. 39.

FIGS. 39 and 40 show still another embodiment of a system to hold down the front of a table saw insert. In this embodiment, a screw 340 extends down from the underside of an insert 342. A bracket 344 is attached to the bottom of the table and the head of screw 340 fits into a slot 346 in the bracket to hold the insert down. The head of screw 340 may be thought of as an example of a first edge, and slot 346 may be thought of as an example of a second edge. The bracket includes a sloped portion 348, and the head of screw 340 contacts the sloped portion and flexes the bracket away as the insert is pushed down into the blade opening until the head of the screw meshes with slot 346. At that point, the bracket flexes back and the slot overlaps the head of screw 340 to hold the insert in place.

Bracket 344 includes a finger tab 350 positioned under a finger hole in the insert. A user can push the tab toward the front of the saw, thereby flexing bracket 344 and freeing screw 340 from slot 346. A spring 352 is positioned to press against the head of screw 340 and the spring is flexed when the insert is installed in the blade opening so when screw 340 is free from slot 346, spring 352 pushes the front of the insert up above the top of the table.

Figure 41:
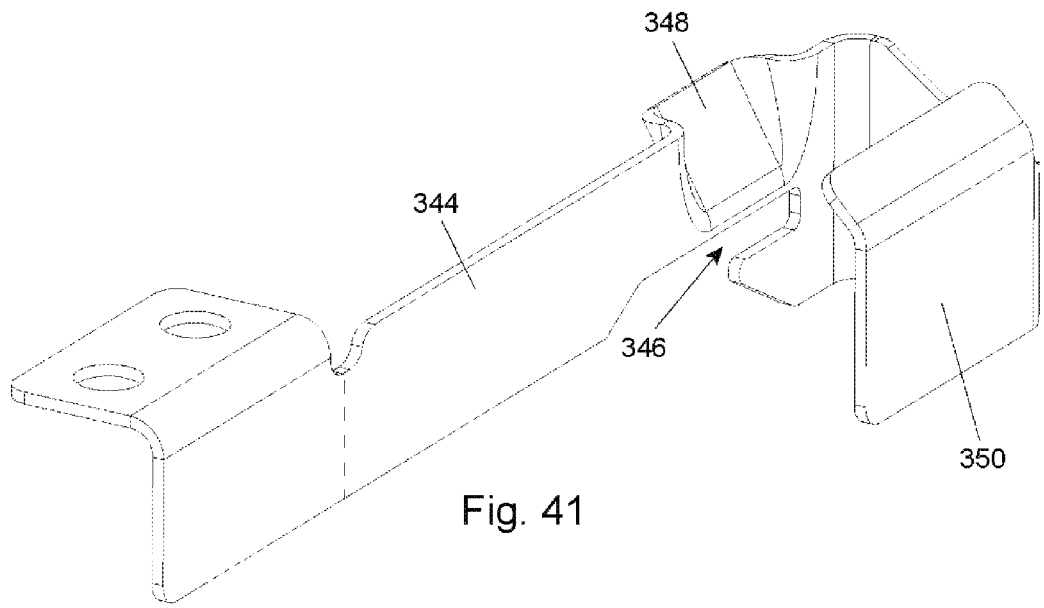
FIG. 41 shows a bracket used in the embodiment of FIG. 39.
Figure 42:
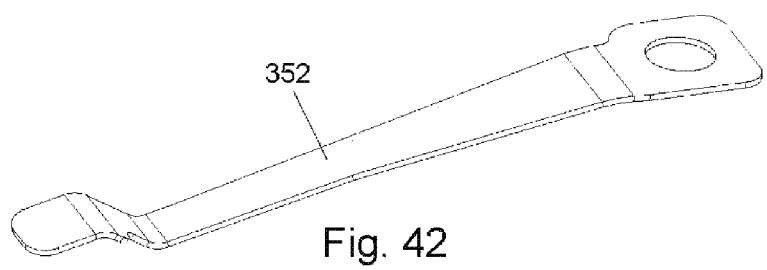
FIG. 42 shows a spring used in the embodiment of FIG. 39.
Figure 43:
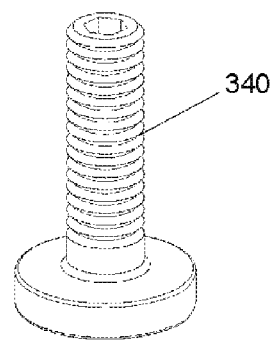
FIG. 43 shows a screw used in the embodiment of FIG. 39.

FIG. 41 shows bracket 344 isolated from other structure. FIG. 42 shows spring 352 by itself. And FIG. 43 shows screw 340.

Figure 44:
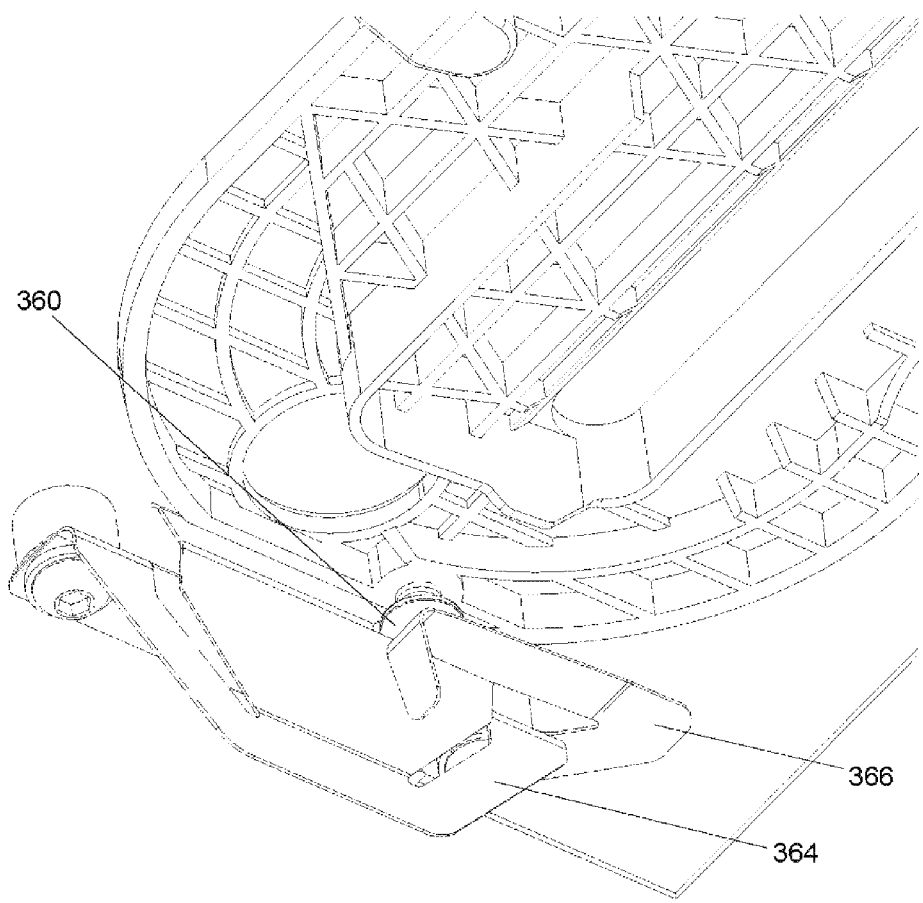
FIG. 44 shows yet another embodiment of a system to hold down the front of a table saw insert.
Figure 45:
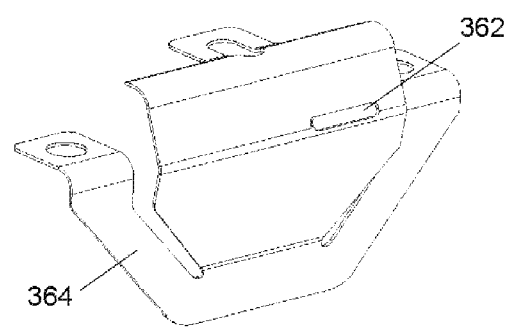
FIG. 45 shows a bracket used in the embodiment of FIG. 44.
Figure 46:
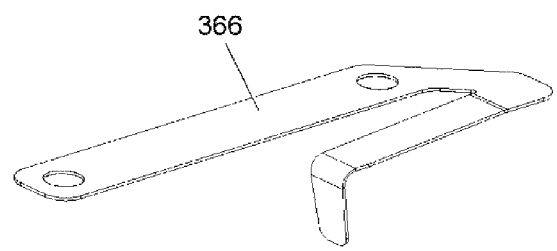
FIG. 46 shows a spring used in the embodiment of FIG. 44.

FIG. 44 shows another similar embodiment of a system to hold down the front of a table saw insert. A screw 360 extends down from the bottom of the insert and fits into a slot 362 in a bracket 364. A spring 366 is mounted to the underside of the table and positioned to press up against screw 360. The head of screw 360 may be thought of as an example of a first edge, and slot 362 may be thought of as an example of a second edge. This embodiment functions similarly to the embodiment shown in FIGS. 39 and 40. A user releases the insert by flexing the center of bracket 364 toward the front of the table saw to release screw 360 from slot 362. When released, spring 366 pushes the front of the insert up.

INDUSTRIAL APPLICABILITY

The inserts described herein are applicable to woodworking power tool equipment, and particularly to table saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

It is believed that the following claims particularly point out certain combinations and sub-combinations that are directed to disclosed inventions. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
    a table having an opening;
    a substantially planar, circular blade configured to extend at least partially above the table through the opening;
    an insert configured to fit within the opening, where the insert has a front end, and where the insert includes a first edge; and
    a latch to hold down the front end of the insert mechanically, where the latch includes a second edge, where the first edge and the second edge overlap automatically when the front end of the insert is pressed down into the opening, and where the overlapping of the first edge and the second edge holds down the front end of the insert mechanically;
    where the first edge is a screw head and the second edge is part of a bracket; and
    where the second edge comprises a slot in the bracket, and where the screw head extends into the slot to hold down the front end of the insert mechanically.

* * * * *